(12) United States Patent
Kim et al.

(10) Patent No.: US 8,286,235 B2
(45) Date of Patent: Oct. 9, 2012

(54) APPARATUS AND METHOD FOR MANAGING RIGHTS OBJECT

(75) Inventors: Yeo-jin Kim, Suwon-si (KR); Yun-sang Oh, Seoul (KR); Kyung-im Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1074 days.

(21) Appl. No.: 11/832,772

(22) Filed: Aug. 2, 2007

(65) Prior Publication Data
US 2008/0155683 A1 Jun. 26, 2008

(30) Foreign Application Priority Data

Dec. 22, 2006 (KR) .................... 10-2006-0132984

(51) Int. Cl.
*G06F 7/00* (2006.01)
(52) U.S. Cl. .............. 726/21; 726/26; 726/27; 713/150; 713/168; 705/51; 705/79; 711/149
(58) Field of Classification Search .................... 726/21, 726/27; 713/150; 705/51, 79; 711/100, 711/149–168
See application file for complete search history.

(56) References Cited

U.S. PATENT DOCUMENTS

| | | | |
|---|---|---|---|
| 6,425,081 B1 | 7/2002 | Iwamura | |
| 7,555,501 B2* | 6/2009 | Kohno | 707/684 |
| 2002/0156737 A1* | 10/2002 | Kahn et al. | 705/51 |
| 2003/0225701 A1* | 12/2003 | Lee et al. | 705/57 |
| 2005/0033967 A1* | 2/2005 | Morino et al. | 713/182 |
| 2005/0044361 A1* | 2/2005 | Chang et al. | 713/167 |
| 2005/0154834 A1* | 7/2005 | Steely et al. | 711/133 |
| 2005/0210249 A1* | 9/2005 | Lee et al. | 713/168 |
| 2005/0216419 A1* | 9/2005 | Lee et al. | 705/59 |
| 2005/0267845 A1* | 12/2005 | Oh et al. | 705/51 |
| 2007/0043667 A1* | 2/2007 | Qawami et al. | 705/50 |
| 2007/0157318 A1* | 7/2007 | Lee et al. | 726/27 |
| 2008/0195671 A1* | 8/2008 | Kim | 707/202 |
| 2008/0282357 A1* | 11/2008 | Sharpe | 726/27 |

FOREIGN PATENT DOCUMENTS

| | | |
|---|---|---|
| EP | 1646204 A1 | 4/2006 |
| JP | 2004-056620 A | 2/2004 |
| KR | 10-2001-0086142 A | 9/2001 |
| KR | 10-2005-0020165 A | 3/2005 |
| KR | 10-2005-0109420 A | 11/2005 |
| WO | 2006075899 A1 | 7/2006 |

* cited by examiner

*Primary Examiner* — Kim Vu
*Assistant Examiner* — Sayed Beheshti Shirazi
(74) *Attorney, Agent, or Firm* — Sughrue Mion, PLLC

(57) ABSTRACT

An apparatus and method for managing a rights object by backing up and restoring the rights object between a host device and a multimedia card are provided. The apparatus includes an input unit that receives an order signal from a user, a rights-object-managing unit that determines whether the rights object can be backed up and restored based on rights object information when the order signal is input, and backs up and restores the rights object according to a result of the determination, and an information-managing unit that manages information related to movement and removal of the rights object and information on the backed up and restored rights object.

11 Claims, 8 Drawing Sheets

FIG. 5

| PERMISSION INDEX(51) = BACKUP | NUMBER OF CONNECTION ID | CONNECTION ID | | LENGTH OF LIMITATION INFORMATION | |
|---|---|---|---|---|---|
| NUMBER OF LIMITATION INFORMATION | | TIME(52) | | COUNT(53) | |
| | | START TIME | END TIME | COUNT | LEFT COUNT |
| | | EXPIRATION FLAG | | VALIDITY PERIOD INFORMATION(55) | |
| | | | | | VALIDITY PERIOD |
| | | DEVICE(54) | | | |
| DEVICE NUMBER | VERSION | LENGTH OF DEVICE ID | BACKUP DEVICE ID | | |
| | | | RESTORATION INFORMATION(57) | | |
| BACKUP FLAG(56) | | VERSION | LENGTH OF DEVICE ID | RESTORATION DEVICE ID | |
| BACKUP TIME | | | | | |

FIG. 6

| RIGHTS OBJECT ID (61) | STATE INFORMATION (62) | TIME INFORMATION (63) | |
|---|---|---|---|
| | | EVENT TIME | EXPIRATION TIME |

| TARGET DEVICE INFORMATION (64) | | |
|---|---|---|
| VERSION | LENGTH OF DEVICE ID | DEVICE ID |

APPARATUS AND METHOD FOR MANAGING RIGHTS OBJECT

CROSS-REFERENCE TO RELATED APPLICATION

This application claims priority from Korean Patent Application No. 10-2006-0132984, filed on Dec. 22, 2006 in the Korean Intellectual Property Office, the disclosure of which is incorporated herein in its entirety by reference.

BACKGROUND OF THE INVENTION

1. Field of the Invention

The present invention relates to managing a rights object, and more particularly, to an apparatus and method for managing a rights object by backing up and restoring the rights object between a host device and a multimedia card.

2. Description of the Related Art

Generally, a rights object (RO) is information needed to legitimately use digital content, which has to be stored and managed in a secure way. A secure multimedia card is storable and portable, which stores digital content or moves it to another device, thereby enabling the digital content to be efficiently used. A current user can buy and use digital content and an RO. However, if the RO is damaged or lost, the user cannot use the purchased digital content. In order to prevent infringement of consumers' rights, backup of the RO is required.

On the assumption that backup of an RO is a copy of data, there is a possibility of a copy of the RO in the backup and restoration process. Accordingly, there are many restrictions in order to prevent the copy of the RO.

FIG. 1 illustrates a configuration of a related art apparatus for backing up an RO.

A process of backing up an RO to a secure multimedia card in a host A will be described in the following.

When a user backs up an RO (S11), if the RO has no backup permission, the process is terminated. In order to restore the backup RO only to a host device (an original device) that performs a backup, the corresponding host device is encrypted using a public key. Here, the RO having backup permission cannot be moved to another device (e.g., a host B), unless the backup RO is removed. If the original RO is moved to another device, there is a possibility of a copy of the RO when the RO is restored.

A process of restoring the backup RO from the secure multimedia card to the host A will be described in the following.

The device in which the backup RO is stored is connected to the original device (i.e., the host A), and the backup RO is restored (S12). Here, the backup RO is free to move to other devices (e.g., hosts B and C), but can be restored only to the original device.

When the backup RO is decrypted using an individual key of the original device, the restoration of the RO is completed.

In the related art apparatus, the backup RO can be restored only to the host device that performed the backup, and the RO having backup permission cannot be moved from the host device to another device, which are problems.

FIG. 2 illustrates a process of copying an RO using a related art 1-pass rights object acquisition protocol (ROAP) process. Here, because the 1-pass ROAP process cannot receive a response from a host device, mutual authentication is not possible. The host device receives all of transmitted data, which presents a security problem.

A rights issuer issues an RO to a host A via the 1-pass ROAP process (S21). At this time, an unauthorized device that exists inside or outside of the host A copies and stores the issued RO (S22).

When the host A moves the issued RO to a host B (S23), the unauthorized device issues the stored RO to the host A via the 1-pass ROAP process (S24). Hence, the copied ROs remain in the hosts A and B.

Accordingly, the RO issued via the 1-pass ROAP process can be reproduced, and is easily copied by unauthorized devices, which are problems.

Korean Unexamined Patent Publication No. 2005-0109420 (Dealing Method of Digital Literary Work for Protecting Copyright) discloses a method of backing up digital content and rights information of the digital content to a specific storage medium, enabling only a specific device to restore the backed up digital content, and playing the digital content according to the rights information, but does not disclose a method of moving an RO freely, backing up and restoring an RO safely.

SUMMARY OF THE INVENTION

The present invention provides an apparatus and method for managing a rights object by safely backing up and restoring the rights object.

The present invention also provides an apparatus and method for managing a rights object which is capable of safely copying and moving the rights object in a 1-pass ROAP process.

According to an aspect of the present invention, there is provided an apparatus for managing an RO, the apparatus including an input unit that receives an order signal from a user, an RO-managing unit that determines whether the RO can be backed up and restored based on RO information when the order signal is input, and backs up and restores the RO according to a result of the determination, and an information-managing unit that manages information related to movement and deletion of the RO and information on the backed up and restored RO.

According to another aspect of the present invention, there is provided a method of managing an RO, the method including receiving an order signal from a user, determining whether the RO can be backed up based on RO information when a backup-order signal is input, backing up the RO according to a result of the determination, determining whether the backed up RO can be restored based on the RO information when a restoration-order signal for the backed up RO is input, restoring the backed up RO according to a result of the determination, and managing information of the backed up and restored RO.

BRIEF DESCRIPTION OF THE DRAWINGS

The above and other aspects of the present invention will become apparent by describing in detail exemplary embodiments thereof with reference to the attached drawings in which:

FIG. 5 illustrates a configuration of permission information and state information for backup in an RO-managing apparatus according to an exemplary embodiment of the present invention;

FIG. 6 illustrates a configuration of rights log information in an RO-managing apparatus according to an exemplary embodiment of the present invention;

DETAILED DESCRIPTION OF EXEMPLARY EMBODIMENTS OF THE INVENTION

Figure 1:
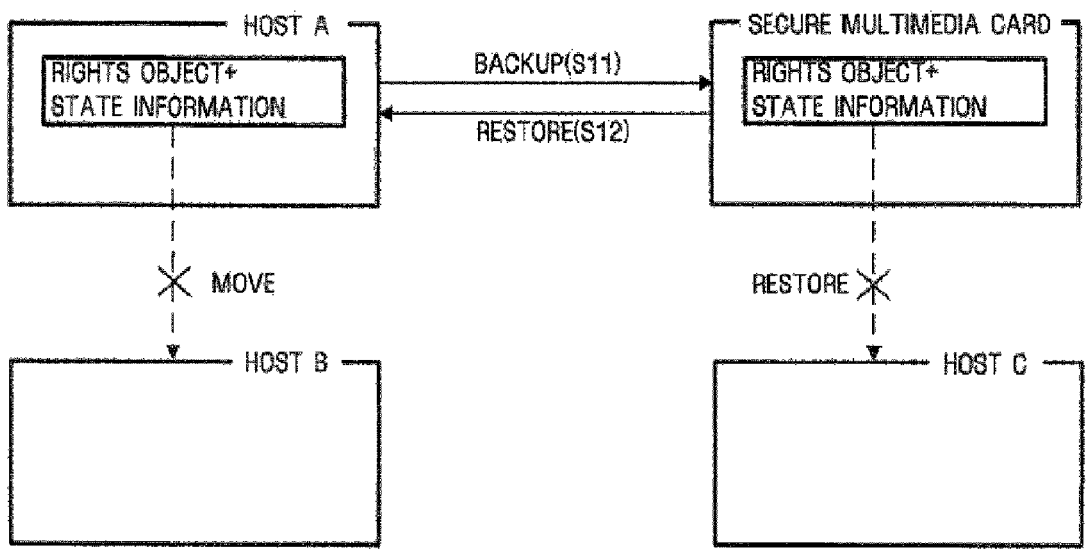
FIG. 1 illustrates a configuration of a related art apparatus for performing RO backup.
Figure 2:
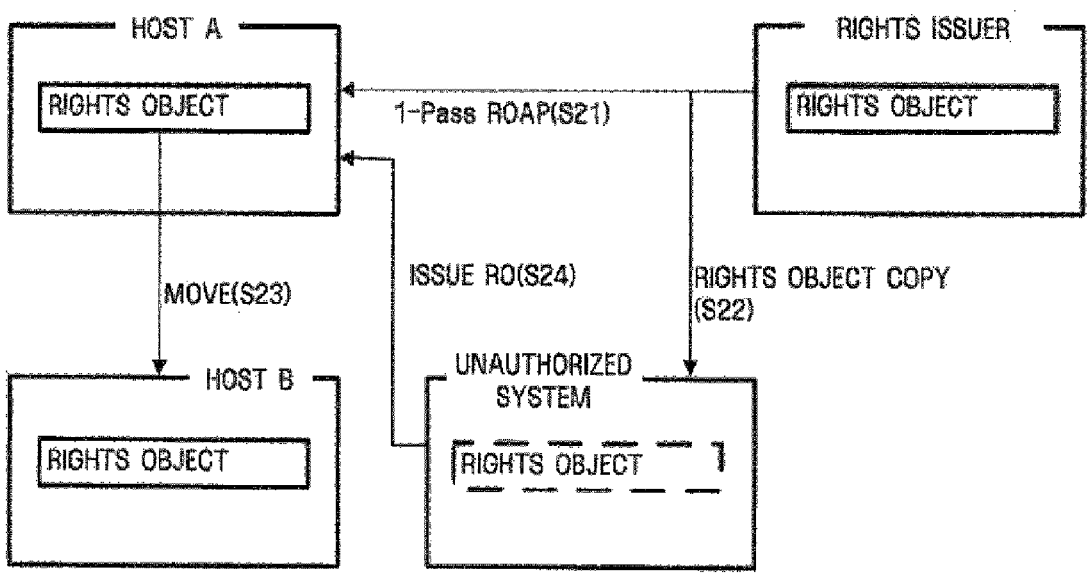
FIG. 2 illustrates a process of copying an RO using a related art 1-pass ROAP process.

Exemplary embodiments of the present invention will be described in detail with reference to the accompanying drawings.

Advantages and features of the present invention and methods of accomplishing the same may be understood more readily by reference to the following detailed description of the exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Terms used in this specification are described in the following.

A Rights Object (RO) refers to permission and constraints for using digital content. An Original RO refers to an RO to be backed up. Backup RO refers to the backed up RO.

Permission refers to rights to use content. A permission index refers to an index for distinguishing the types of permissions (e.g., play, display, execute, move, and backup)

Constraint refers to a list that limits the count, time, and device.

State Information refers to information showing which type is used by content among types of permissions of an RO.

A Host refers to a device that plays content according to rights of an RO. In the present invention, a device that manages an RO is referred to as a host device.

A Rights Issuer issues an RO to a host.

A Secure Multimedia Card stores digital content, an RO and SI, and supports a host to play the digital content according to rights of the RO.

A Rights Log is recorded by a host in order to manage an RO having backup rights. For example, the host records the rights log when the RO is removed or moved.

Backup refers to a process of copying an RO and SI in order to prevent loss of the RO and SI. Here, a backup RO and SI are not activated, and therefore cannot be used until they are restored.

Restore refers to a process of restoring a backup RO and SI to an available state, removing the backup RO, and also transferring the backup RO and SI themselves into the available state.

Move refers to a process of copying an RO and SI from one device (e.g., a host A) to another device (e.g., a host B), and then removing the corresponding RO and SI from the host A.

Remove refers to a process of completely removing an RO and SI from one device.

1-Pass Rights Object Acquisition Protocol (ROAP) is defined by OMA DRM 2.0. A host can only receive a message from the RI, and cannot respond.

Figure 3:
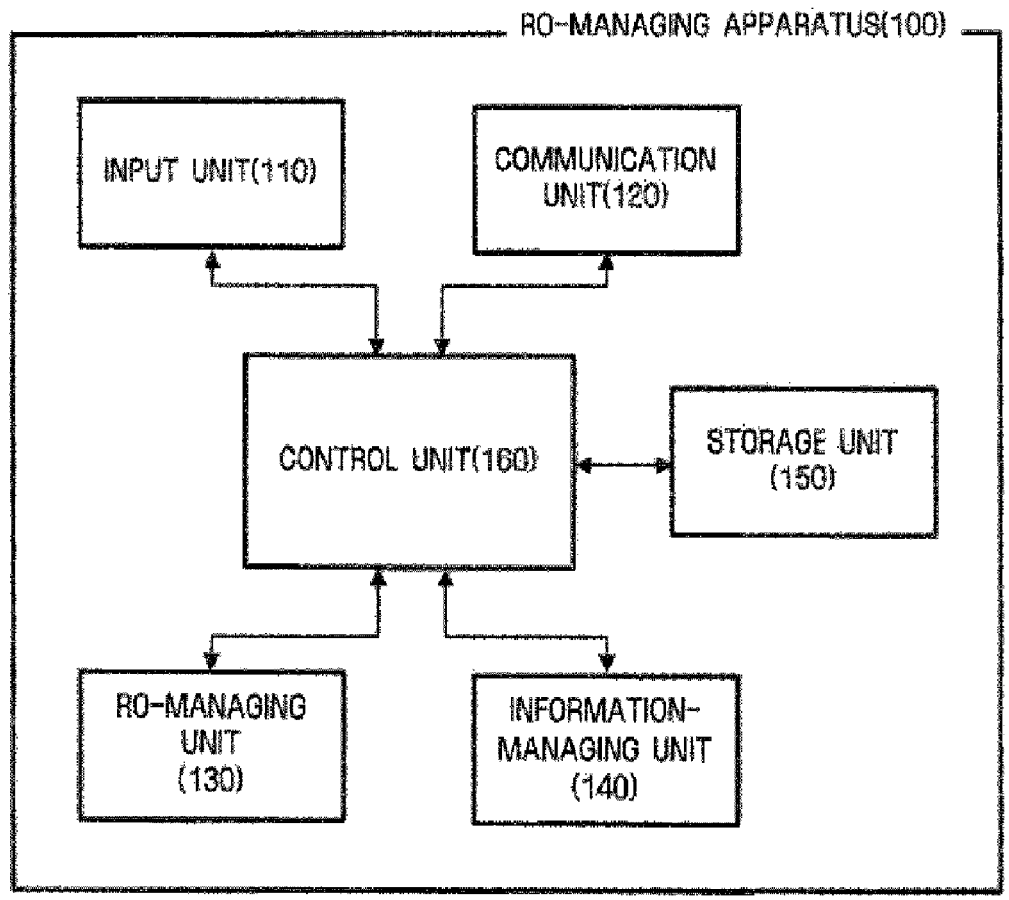
FIG. 3 is a block diagram illustrating the inside of an RO-managing apparatus according to an exemplary embodiment of the present invention.

FIG. 3 is a block diagram illustrating the inside of an RO-managing apparatus according to an exemplary embodiment of the present invention.

Referring to FIG. 3, an RO-managing apparatus 100 includes an input unit 110, a communication unit 120, an RO-managing unit 130, an information-managing unit 140, a storage unit 150, and a control unit 160.

The term "unit," as used herein, means, but is not limited to, a software or hardware component, such as a Field Programmable Gate Array (FPGA) or an Application Specific Integrated Circuit (ASIC), which performs certain tasks. A module may advantageously be configured to reside in the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The input unit 110 receives an order signal generated by a user. Here, the order signal refers to one of backup, restoration, move, and deletion.

For example, the input unit 110 receives a user's order to back up an RO in a secure location.

The communication unit 120 transmits and receives an order signal for an RO backup and restoration by communicating with a secure multimedia card.

The RO-managing unit 130 backs up an RO according to the order to back up the RO, and restores the backup RO according to the restoration order. Here, an original RO is backed up in the secure multimedia card, and the backup RO may be restored in the RO-managing apparatus 100 or in the secure multimedia card.

The RO-managing unit 130 checks whether the RO can be backed up and restored based on RO information stored in the storage unit 150 before backing up and restoring the RO, and performs backup and restoration according to the checked result.

For example, the RO-managing unit 130 checks whether the RO to be backed up has a backup permission. Also, the RO-managing unit 130 checks whether a device to restore the RO is identical with device information in restoration information, and whether the original RO has been removed from the corresponding device.

The information-managing unit 140 manages information on an RO backed up and restored through the RO-managing unit 130, and information related with movement and deletion of the RO.

For example, the information-managing unit 140 generates and removes RO permission (e.g., backup) information, information on an available time to backup, a count, and a device, validity information, information on whether an RO is backed up, and information on a device in which the RO can be restored.

The storage unit 150 stores digital content, an RO, and RO information managed by the information-managing unit 140. Here, permission information for backup of the RO, state information, and rights log information, which is the information on the stored RO, will be described in detail with reference to FIGS. 5 and 6.

The control unit 160 controls operations of functional blocks 110 to 150 that configure the RO-managing apparatus 100.

Figure 4:
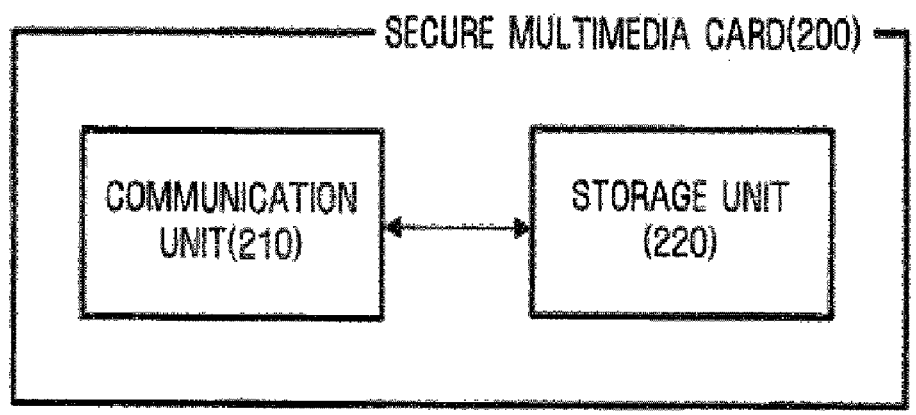
FIG. 4 is a block diagram illustrating the inside of a secure multimedia card in an RO-managing apparatus according to an exemplary embodiment of the present invention.

FIG. 4 is a block diagram illustrating the inside of a secure multimedia card in an RO-managing apparatus according to an exemplary embodiment of the present invention.

Referring to FIG. 4, a secure multimedia card 200 includes a communication unit 210 and a storage unit 220.

The communication unit 210 transmits and receives an order signal for backup and restoration of an RO by communicating with the RO-managing apparatus 100.

The storage unit 220 stores the RO backed up and restored by the RO-managing apparatus 100, and also stores state information for the RO and digital content.

FIG. 5 illustrates a configuration of permission information and state information for backup in an RO-managing apparatus according to an exemplary embodiment of the present invention. Here, backup-permission information and state information can be written using various programming languages such as binary code, Extensible Markup Language (XML), binary XML, which are stored in the storage unit 150.

Referring to FIG. 5, a permission-index field 51 records types of permission (e.g., backup) of the RO. If a rights issuer permits backup of all ROs, backup permission and constraints may be not indicated (if a backup function is supported as a default). However, backup log information and state information of the RO have to be recorded, when the RO is backed up.

An end time and an expiration flag are recorded in a time field 52 that limits a backup-available time. Backup count and left backup count are recorded in a count field 53. The number and version of a device, the length of a device identification (ID), and a backup device ID are recorded in a device field 54. Here, information is not always recorded in the time field 52, the count field 53, and the device field 54.

A validity period information field 55 manages a rights log. If time information is recorded in the validity period information field 55, the corresponding time is a validity period when the rights log is managed. The rights issuer may additionally decide a rights log management period. If there is no time information in the validity period information field 55, the rights issuer may set a validity period when the rights log is managed in the validity period information field 55.

If the rights issuer sets the validity period to one year, the rights log is generated, and may be deleted after one year.

A backup flag field 56 may check whether to perform backup, which records a backup time. If the value of the backup flag field 56 is "NULL," the corresponding RO does not have a backup RO.

The restoration information field 57 records information on a device in which the backup RO is restored. When a backup is performed, the information is recorded in the state information of the backup RO. The state information of the original RO is maintained as "NULL."

FIG. 6 illustrates a configuration of rights log information in an RO-managing apparatus according to an exemplary embodiment of the present invention. Here, the rights log can be, for example, binary code, XML, or binary XML, which is stored in the storage unit 150.

The rights log is used when the original RO is removed from the host or moved to another host.

Referring to FIG. 6, an RO ID field 61 records the ID of an RO. The state (e.g., move and remove) of the RO is recorded in a state information field 62. A time information field 63 records an event time that shows a removing time when the RO is removed, and a move time when the RO is moved, and an expiration time showing a time when the rights log is removed. A target device information field 64 records information on a host to which the RO is moved.

For a validity period of the rights log, if the backup RO is restored in the corresponding host, the related rights log is deleted. The rights log that reaches the expiration time is deleted in order to prevent the rights log frame becoming very large.

In case of an RO in which the validity period is recorded, the expiration time is the same as the end time of the time information field 63. In case of a permanent RO in which the validity period is not recorded, a generating time of the RO plus the validity period when the RO is managed equals to the expiration time.

Figure 7:
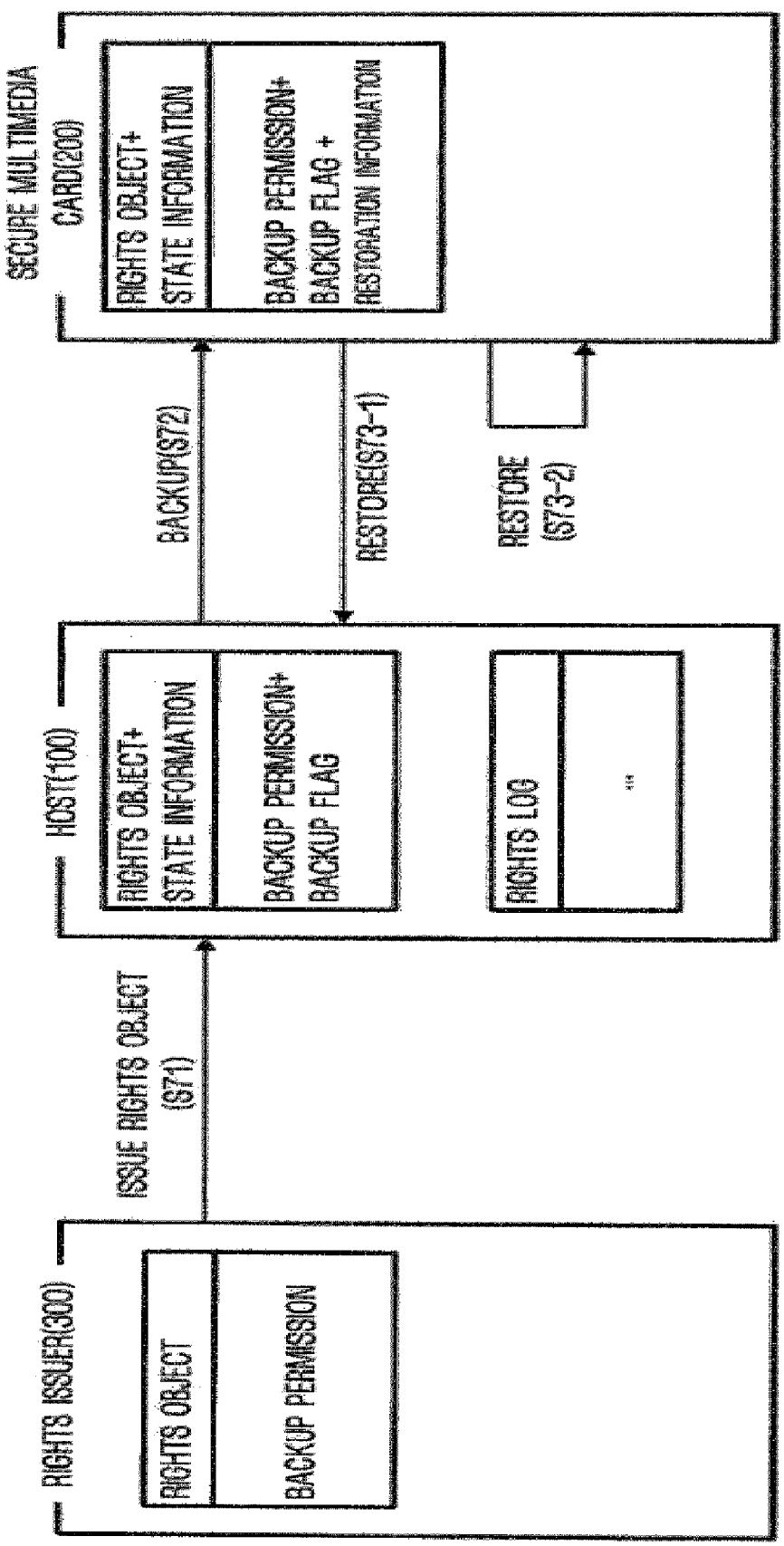
FIG. 7 illustrates a process of backing up and restoring an RO in an RO-managing apparatus according to an exemplary embodiment of the present invention.

FIG. 7 illustrates a process of backing up and restoring an RO in an RO-managing apparatus according to an exemplary embodiment of the present invention. A system for managing an RO includes a host 100, a secure multimedia card 200, and a rights issuer 300, which is described based on the configuration of permission information and state information for backup illustrated in FIG. 5 and the configuration of the rights log illustrated in FIG. 6.

Referring to FIG. 7, the rights issuer 300 issues the RO to the host 100 (S71).

Particularly, the rights issuer 300 grants a backup permission to the corresponding RO. Hence, backup, permission of the corresponding RO is recorded in the permission-index field 51.

Then, a scope of backup (e.g., count, time and device) is selectively recorded, and validity period information is recorded in the validity period information field 55.

If time information is recorded in the validity information field 55, the corresponding time is a validity period when the rights log is managed. If there is no time information in the validity information field 55, the rights issuer 300 may set a validity period when the rights log is managed.

The host 100 configures state information on the RO issued by the rights issuer 300, and backs up the RO and the state information using the secure multimedia card 200 (S72).

When the input unit 110 receives a user's order to back up the RO, the RO-managing unit 130 checks whether the RO has backup permission. In the checked result, if the RO has no backup permission, the process is terminated.

If the RO has backup permission (i.e., permission index=backup), the backup of the RO is performed. At this time, the information-managing unit 140 renews the state information of the original RO. That is, the information-managing unit 140 records the backup time in the backup flag field 56, and reduces the left count by 1 when the count field 53 is limited. The original RO that has the backup RO is distinguished from an RO that has no backup RO via a backup flag.

The RO-managing unit 130 stores the backup RO to the secure multimedia card 200 by copying the RO and the state information to the secure multimedia card 200. The information-managing unit 140 renews the state information of the backup RO. That is, the information-managing unit 140 generates restoration information that registers the host 100, which performs backup, as a restoration device in the secure multimedia card 200. Hence, the backup RO is distinguished from the original RO using the restoration information. Here, the backup RO cannot be used, because it is not activated until it is restored.

Then, the RO-managing unit 130 of the host 100 restores the backup RO stored in the secure multimedia card 200. Here, the method of restoring the backup RO is divided into a method of restoring the backup RO in the host 100, and a method of restoring the backup RO in the secure multimedia card 200.

The RO-managing unit 130 checks whether a device to restore the RO is identical with device information registered in the restoration information before restoring the backup RO.

The RO-managing unit 130 checks the state information field 62 of the rights log of the host 100 (e.g., the host A) in order to check whether the corresponding original RO is moved to another host (e.g., the host B).

In the checked result, the original RO is moved to another host (e.g., the host B), the RO cannot be restored in the host (e.g., the host A). After information of the host is moved to the target device information field 64 of the rights log, the process of restoring RO is terminated.

If the original RO is removed from the host 100, it is possible to restore the backup RO to the host (e.g., the host A).

The RO-managing unit 130 of the host 100 can activate the RO by restoring the backup RO (S73-1). Also, the RO-managing unit 130 of the host 100 can activate the RO after backing up the backup RO to the secure multimedia card 200, and storing state information (S73-2).

The state information of the restored RO is renewed via the information-managing unit 140. For example, because the restored backup RO becomes the original RO, "NULL" is recorded in the backup flag field 56. Because the restoration is terminated, "NULL" is recorded in the restoration information field 57.

Figure 8:
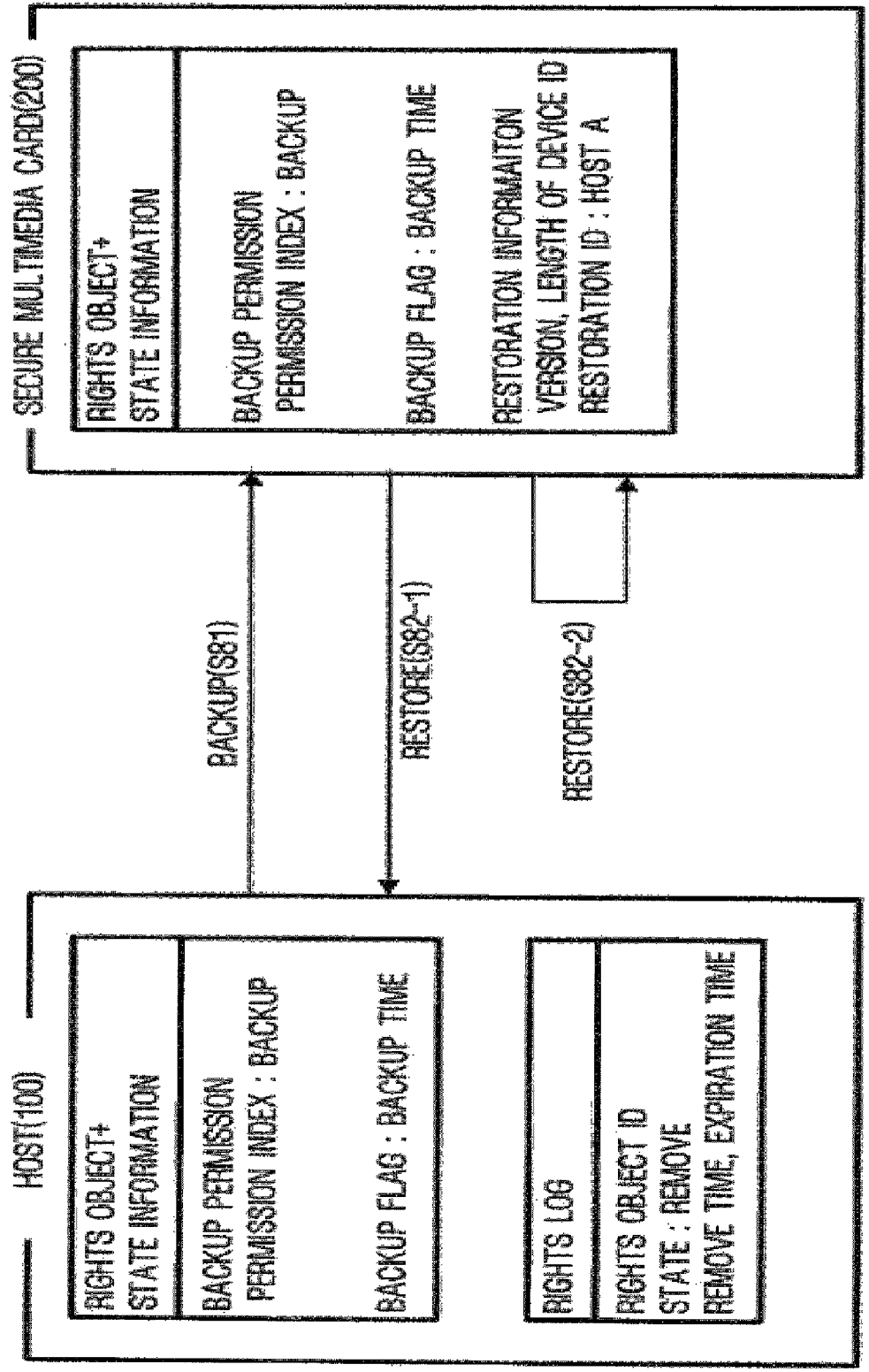
FIG. 8 illustrates a process of restoring an RO if an original RO is removed from a host after backup of the RO in an RO-managing apparatus according to an exemplary embodiment of the present invention.

FIG. 8 illustrates a process of restoring an RO if an original RO is removed from a host after backup of the RO in an RO-managing apparatus according to an exemplary embodiment of the present invention.

Referring to FIG. 8, the host 100 backs up the RO to the secure multimedia card 200 (S81). When the RO is removed from the host 100, the rights log is generated.

In other words, the ID of the removed RO is recorded in the RO ID field 61 of the rights log. The state information field 62 records that the RO is removed. The time information field 63 records a time when the RO is removed and an expiration time. The target device information field 64 records "NULL," because the RO is not moved.

If a predetermined record exists in the time field 52 when the expiration time is recorded, an end time shown by the RO is recorded as the expiration time of the rights log. If a predetermined record does not exist in the time field 52, the validity period recorded in the validity period information field 55 is added to the time when the rights log is generated, which is recorded as the expiration time.

When the backup RO is restored from the secure multimedia card 200 to the host 100, it is checked whether the original RO was removed by checking the rights log of the host 100. If the original RO was removed, the RO is restored to the host 10 (S82-1), and also may be restored to the secure multimedia card 200 (S82-2).

When the restoration of the backup RO is completed, all records of the related RO are deleted from the rights log. Regardless of the completion of the restoration of the backup RO, the expiration time is periodically checked, and therefore the expired rights log is removed.

Figure 9:
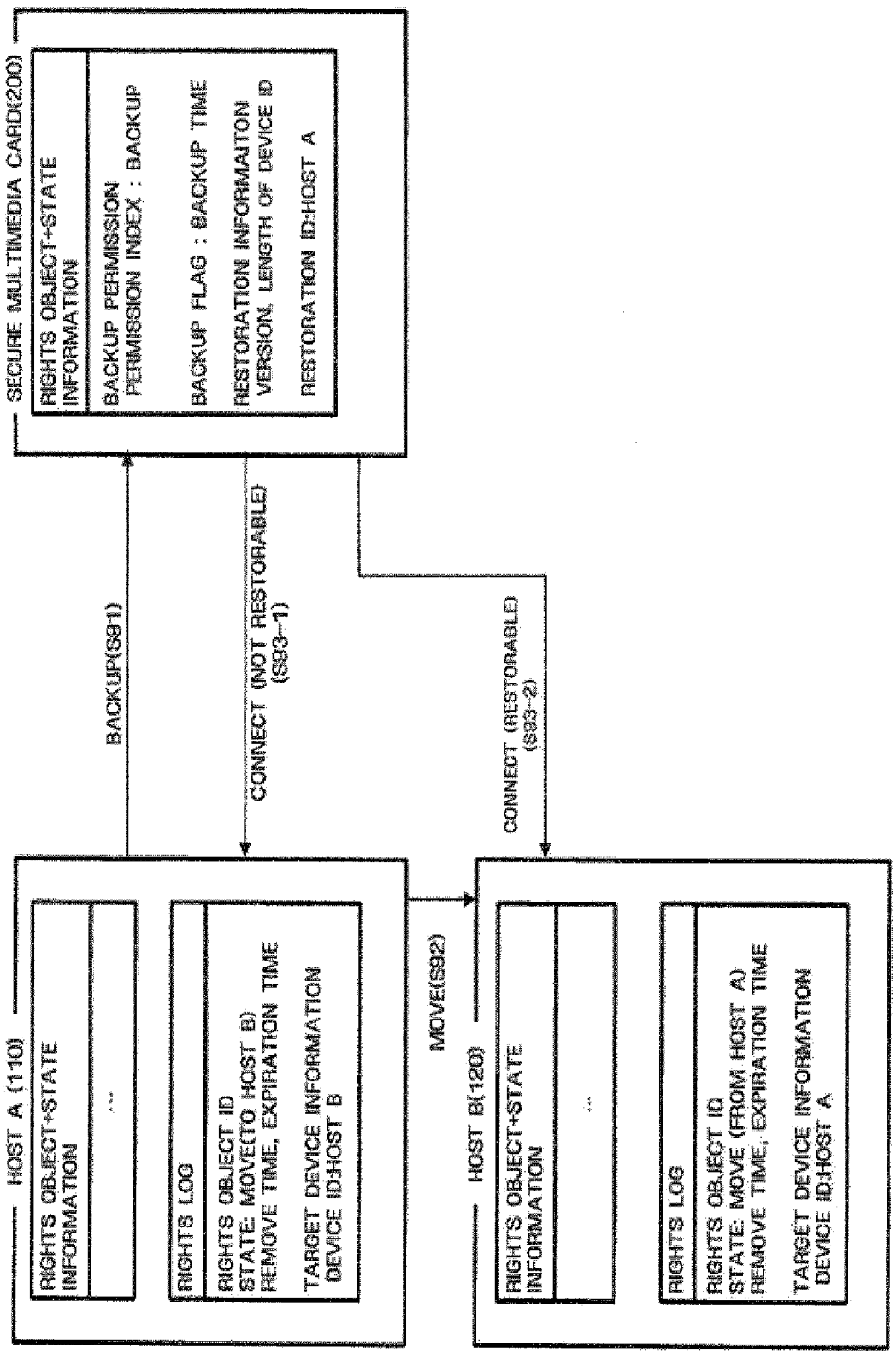
FIG. 9 illustrates a process of restoring an RO if an original RO is moved to another host after backup of the RO in an RO-managing apparatus according to an exemplary embodiment of the present invention.

FIG. 9 illustrates a process of restoring an RO if an original RO is moved to another host after backup of the RO in an RO-managing apparatus according to an exemplary embodiment of the present invention.

Referring to FIG. 9, a host A 110 backs up the RO to the secure multimedia card 200 (S91). Then, the host A 110 generates a rights log after moving the original RO to a host B 120 (S92).

That is, the ID of the moved RO is recorded in the RO ID field 61 of the rights log. The state information field 62 records that the RO is moved to the host B. The time information field 63 records a time when the RO is moved and an expiration time. The target device information field 64 records information on the host to which the RO is moved (e.g., the host B).

The secure multimedia card 200 checks the rights log of the host A 110 in order to connect to the host A 110 or restore the backup RO. If the original RO was moved to another host (e.g., the host B), the secure multimedia card 200 cannot restore the backup RO to the host A 110 (S93-1). Here, the secure multimedia card changes restoration device information of the backup RO into target device (i.e., the host B) information recorded in the rights log of the host A, and encrypts the backup RO using a public key of the changed target device.

The secure multimedia card 200 checks the rights log of the host B 120 in order to connect to the host B 120 or restore the backup RO. If the original RO was moved from the host A 110 to the host B 120, the secure multimedia card 200 can restore the backup RO to the host B 120 (S93-2). However, because the original RO already exists in the host B 120, restoration of the backup RO is not required.

If the RO is removed after the original RO is moved to the host B 120, the secure multimedia card 200 can restore the backup RO to the host B 120.

Figure 10:
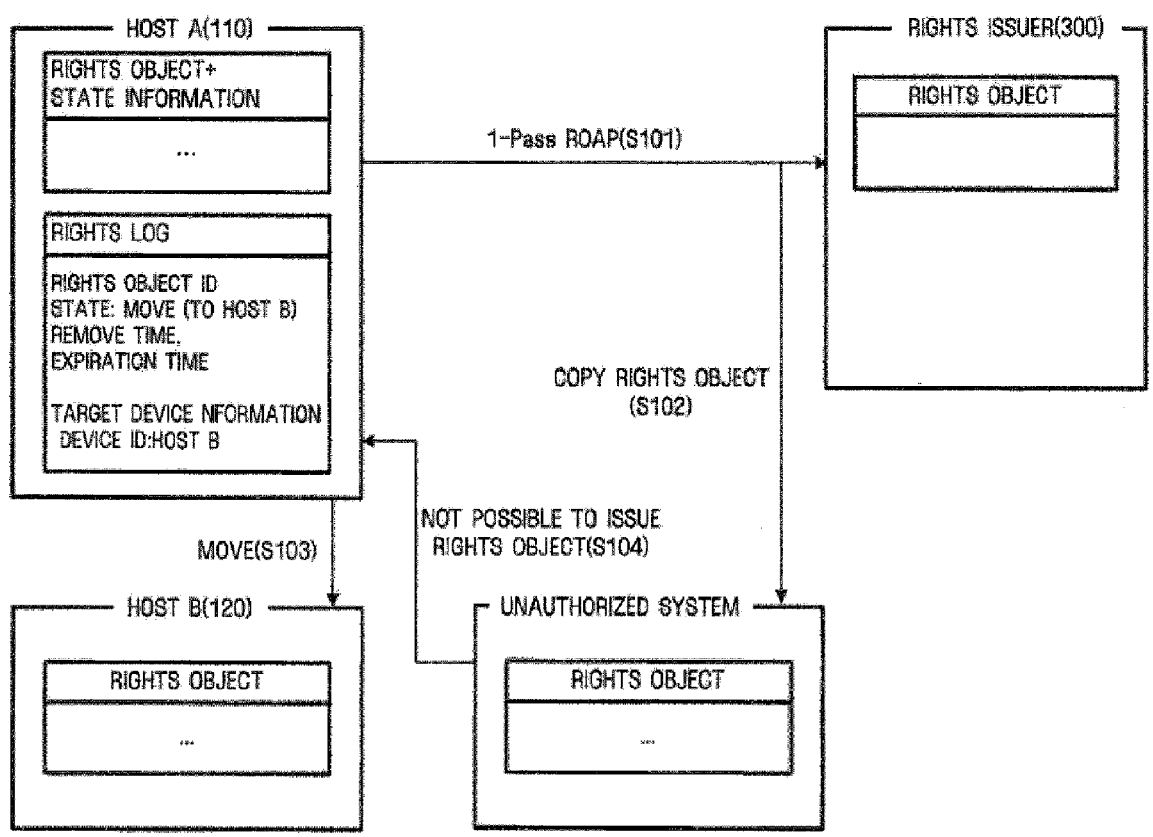
FIG. 10 illustrates an example of preventing an RO from being copied in an 1-pass ROAP process according to an exemplary embodiment of the present invention.

FIG. 10 illustrates an example of preventing an RO from being copied in an 1-pass ROAP process according to an exemplary embodiment of the present invention.

Referring to FIG. 10, a rights issuer 300 issues an RO to a host A 110 via an 1-pass ROAP process (S101). At this time, an unauthorized device that exists inside or outside of the host A 110 illegally copies the issued RO (S102).

When the RO is move from the host A 110 to a host B 120 (S103), a rights log is generated in the host A 110.

That is, the ID of the moved RO is recorded in the RO ID field 61 of the rights log. The state information field 62 records that the RO is moved to the host B 120. The time information field 63 records a time when the RO is moved and an expiration time. The target device information field 64 records information on the host to which the RO is moved (e.g., the host B).

When the unauthorized device reissues an RO to the host A 110 via the 1-pass ROAP process, the host A 110 checks the rights log. In the checked result, because there is a record showing that the issued RO was moved to the host B 120 in the rights log of the host A 110, the unauthorized device cannot reissue the RO (S104).

When the unauthorized device moves an RO to the secure multimedia card 200, because the unauthorized device cannot generate a secure key of the corresponding RO, it is not possible to move the RO to the secure multimedia card 200. Here, the secure key, e.g., a public key is used to authenticate a subject that issues or receives an RO (e.g., the rights issuer, the host, and the secure multimedia card) and a subject that moves or receives an RO, when the RO is issued or moved.

As described above, the apparatus and method for managing an RO according to the present invention produces one or more of the effects described below.

It is possible to back up an RO used in a host to a secure multimedia card and to safely restore a backup RO, even if the RO stored in the host is removed or moved to another host.

When using predetermined content, if backing up the RO of the corresponding content, a user can know the position of the backup RO, and therefore can easily manage content and the RO.

It is possible to compensate for a weakness of the 1-pass ROAP process, thereby preventing authorized copy of an RO.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for managing a rights object, the apparatus comprising:
    an input unit that receives an order signal from a user;
    a rights-object-managing unit that determines whether the rights object can be backed up and restored based on rights object information when the order signal is input, and backs up and restores the rights object according to a result of the determination; and
    an information-managing unit that manages information related to movement and deletion of the rights object and information on the backed up and restored rights object, wherein the rights object information comprises information on the backup of the rights object, state information, and rights log information,
    wherein the backed up rights object and the state information are not activated until they are restored,
    wherein the determining whether the backed up rights object can be restored and the restoring the backed up rights object comprise:
    determining whether a device to restore the backed up rights object is identical with device information registered in restoration information;
    checking whether an original rights object is removed from a corresponding device, when the device is identical with the device information; and restoring the backed up rights object, when the original rights object is removed.

2. The apparatus of claim 1, wherein the rights object is backed up to a secure multimedia card.

3. The apparatus of claim 2, further comprising:
    a communication unit that transmits and receives the order signal for the backup and restoration of the rights object by communicating with the secure multimedia card.

4. The apparatus according to claim 1, wherein the rights object is restored by a process of restoring the rights object to an available state and removing the backed up rights objects.

5. The apparatus according to claim 1, wherein the rights object is backed up by a process of copying the rights object to prevent loss of the rights object.

6. The apparatus according to claim 1, wherein the rights log information comprises an ID of the rights object, a state of the rights object, a move time when the rights object is moved, and information on a host to which the rights object is moved.

7. The apparatus according to claim 1, wherein movement of the rights object comprises copying the rights object from a first device to a second device and removing the rights object from the first device, and backup of the rights object comprises copying the rights object and the backup rights object is not activated until restored.

8. A method of managing a rights object, the method comprising:
    receiving a back-up order signal from a user;
    determining whether the rights object can be backed up based on rights object information when the backup-order signal is input;
    backing up the rights object according to a result of the determination;
    determining whether the backed up rights object can be restored based on the rights object information when a restoration-order signal for the backed up rights object is input;
    restoring the backed up rights object according to a result of the determination; and
    managing information of the backed up and restored rights object, wherein the rights object information comprises information on the backup of the rights object, state information, and rights log information,
    wherein the backed up rights object and the state information are not activated until they are restored,
    wherein the determining whether the backed up rights object can be restored and the restoring the backed up rights object comprise:
    determining whether a device to restore the backed up rights object is identical with device information registered in restoration information;
    checking whether an original rights object is removed from a corresponding device, when the device is identical with the device information; and restoring the backed up rights object, when the original rights object is removed.

9. The method of claim 8, wherein the determining whether the rights object can be backed up comprises determining whether a corresponding rights object has a backup permission by checking the rights object information before the backup of the rights object is performed.

10. The method of claim 8, further comprising terminating the process of resorting the rights object, if the original rights object is moved.

11. The method of claim 8, wherein the rights object is backed up to a secure multimedia card.

* * * * *